H. INMAN, DEC'D.
INMAN MANUFACTURING CO., INC., ASSIGNEE.
PAPER BOX MACHINE.
APPLICATION FILED JUNE 26, 1913.
Reissued Oct. 13, 1914.
13,807.
5 SHEETS—SHEET 1.
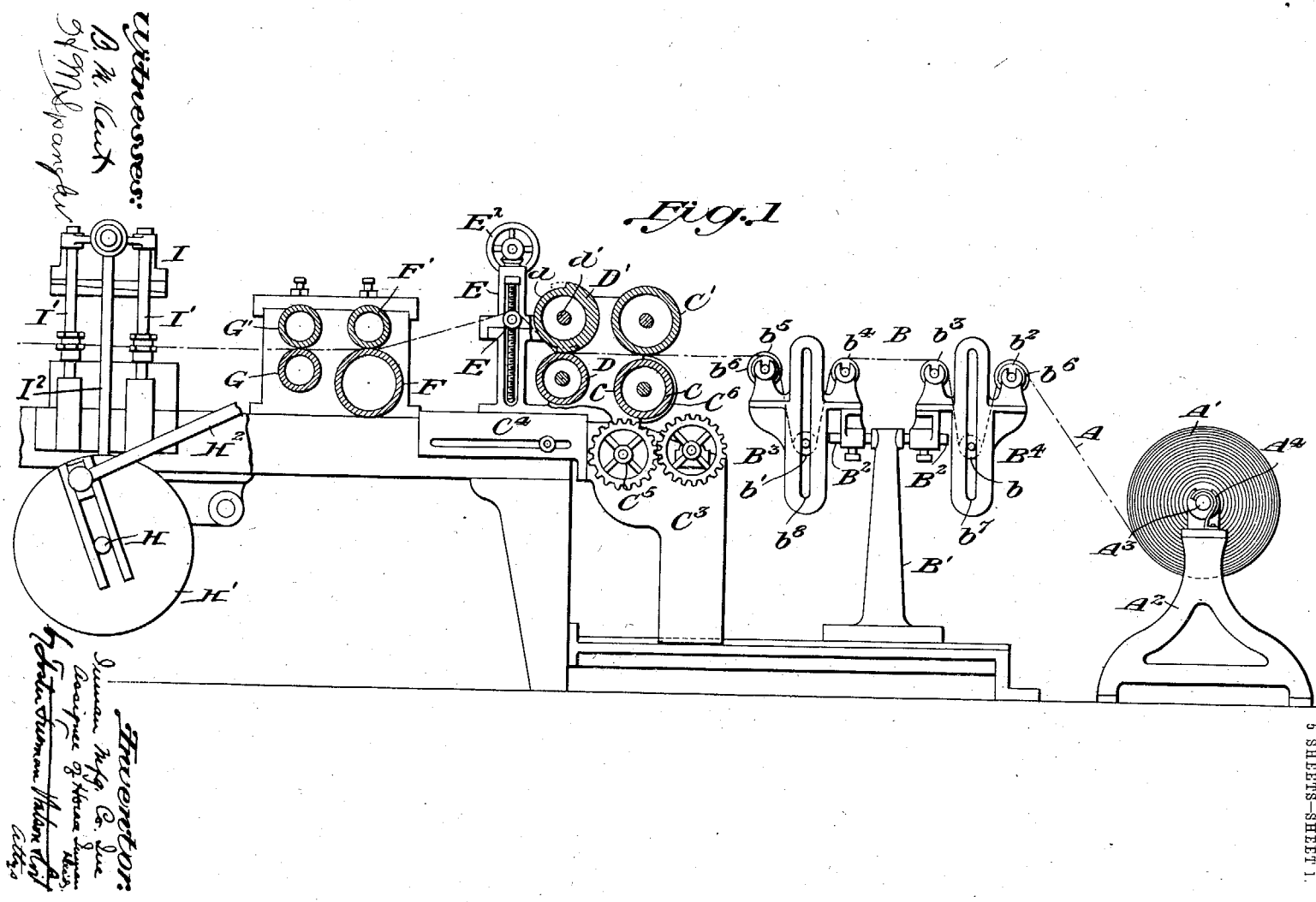

H. INMAN, DEC'D.
INMAN MANUFACTURING CO., INC., ASSIGNEE.
PAPER BOX MACHINE.
APPLICATION FILED JUNE 26, 1913.
Reissued Oct. 13, 1914.
13,807.
5 SHEETS—SHEET 2.
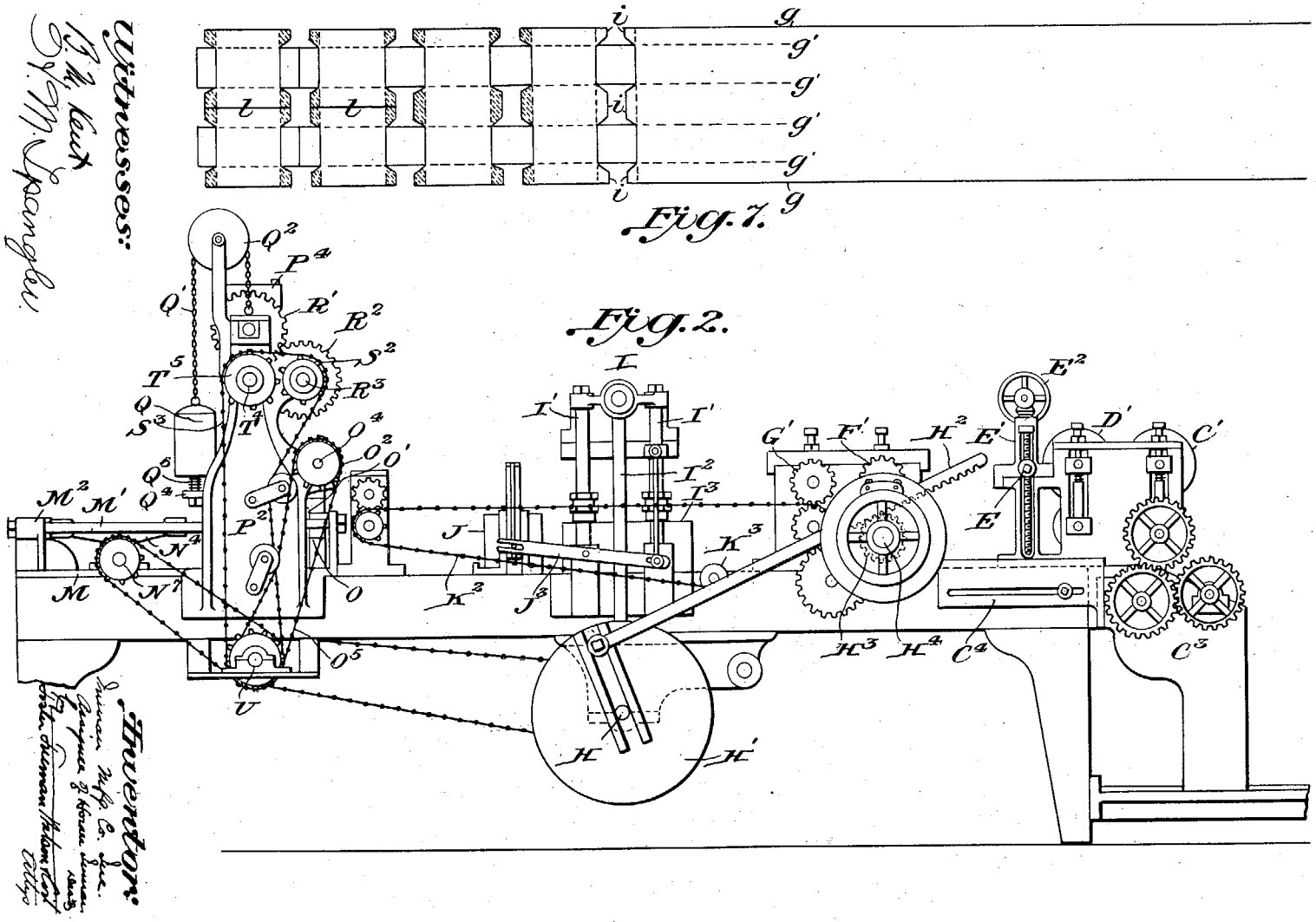
Witnesses:
B. M. Kent
H. M. Spangler
Inventor:
Inman Mfg. Co. Inc.
Assignee of Horace Inman deceased
by Inter Inman Watson Kent
Attys

H. INMAN, DEC'D.

INMAN MANUFACTURING CO., INC., ASSIGNEE.

PAPER BOX MACHINE.

APPLICATION FILED JUNE 26, 1913.

Reissued Oct. 13, 1914.

13,807.

5 SHEETS—SHEET 3.

Witnesses:

B. M. Kent

W. M. Spangler

Inventor:

Inman Mfg. Co., Inc.

Assignee of Horace Inman deceased.

by Foster Freeman Watson & Coit

Attys

H. INMAN, DEC'D.

INMAN MANUFACTURING CO., INC., ASSIGNEE.

PAPER BOX MACHINE.

APPLICATION FILED JUNE 26, 1913.

Reissued Oct. 13, 1914.

13,807.

5 SHEETS—SHEET 4.

Witnesses:

B. M. Kent

H. M. Spangler

Inventor:

Inman Mfg. Co. Inc.

Assignee of Horace Inman deceased.

by Foster Freeman Watson & Coit

Attys

H. INMAN, DEC'D.

INMAN MANUFACTURING CO., INC., ASSIGNEE.

PAPER BOX MACHINE.

APPLICATION FILED JUNE 26, 1913.

Reissued Oct. 13, 1914.

13,807.

5 SHEETS—SHEET 5.

Witnesses:

B. M. Kent

J. M. Spangler

Inventor:

Inman Mfg Co., Inc.

Assignee of Horace Inman deceased by Foster Freeman Watson & Coit

Attys

UNITED STATES PATENT OFFICE.

HORACE INMAN, DECEASED, LATE OF AMSTERDAM, NEW YORK, BY THE ASSIGNEE, INMAN MANUFACTURING CO., INC., OF AMSTERDAM, NEW YORK, A CORPORATION OF NEW YORK.

PAPER-BOX MACHINE.

13,807. Specification of Reissued Letters Patent. Reissued Oct. 13, 1914.

Original No. 996,086, dated June 27, 1911, Serial No. 296,306. Application for reissue filed June 26, 1913. Serial No. 775,974.

*To all whom it may concern:*

Be it known that HORACE INMAN, deceased, formerly residing at Amsterdam, in the county of Montgomery, State of New York, did invent certain new and useful Improvements in Paper-Box Machines, of which the following is a specification.

This invention relates to machines for making paper boxes, and has for its object to improve and simplify the construction of such machines and make them capable of making complete boxes from a continuous web of paper, and to these ends the invention consists in the various features of construction and arrangement of parts having the general mode of operation and producing the general results, substantially as hereinafter more particularly set forth.

Figures 3, 6:
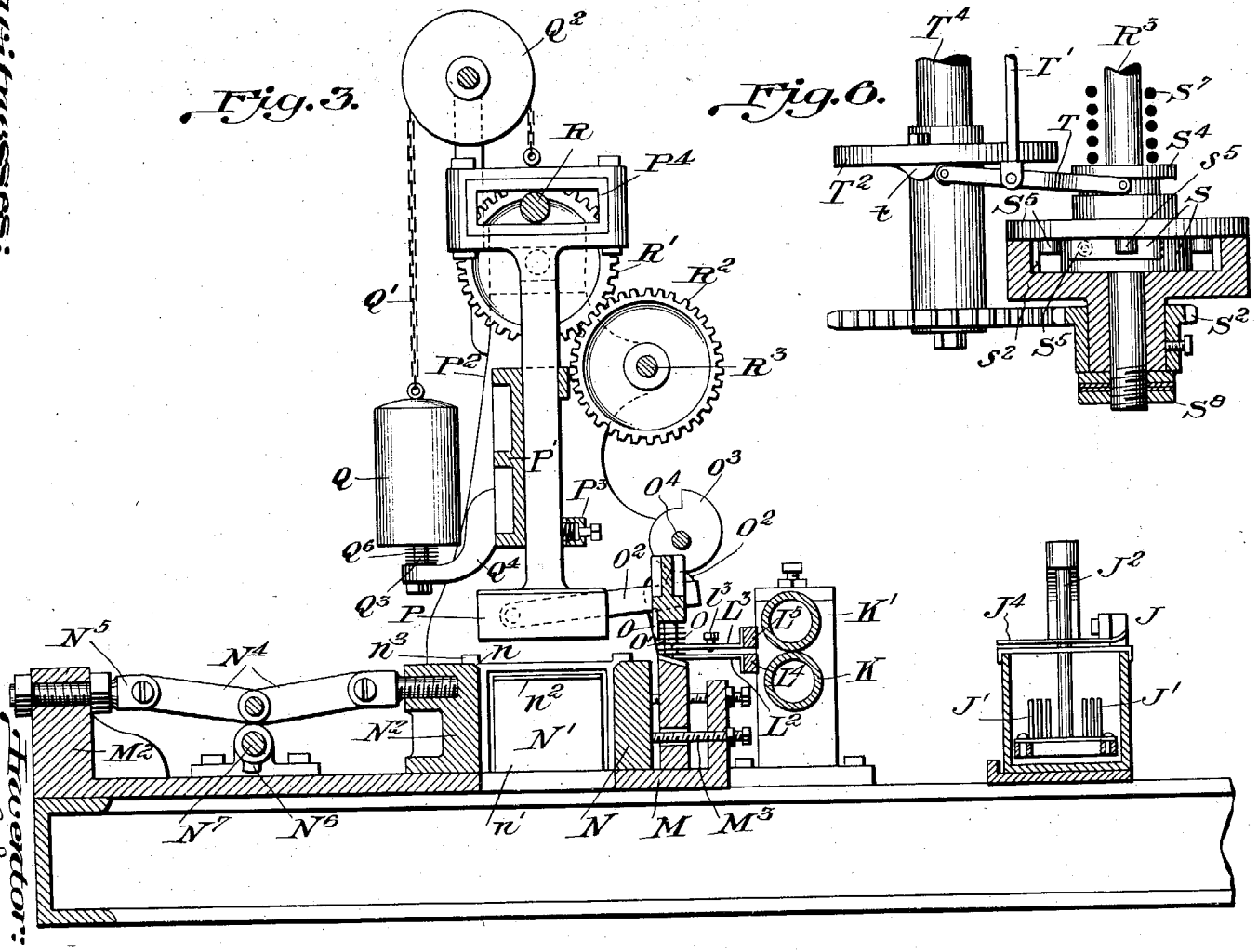
Figure 4:
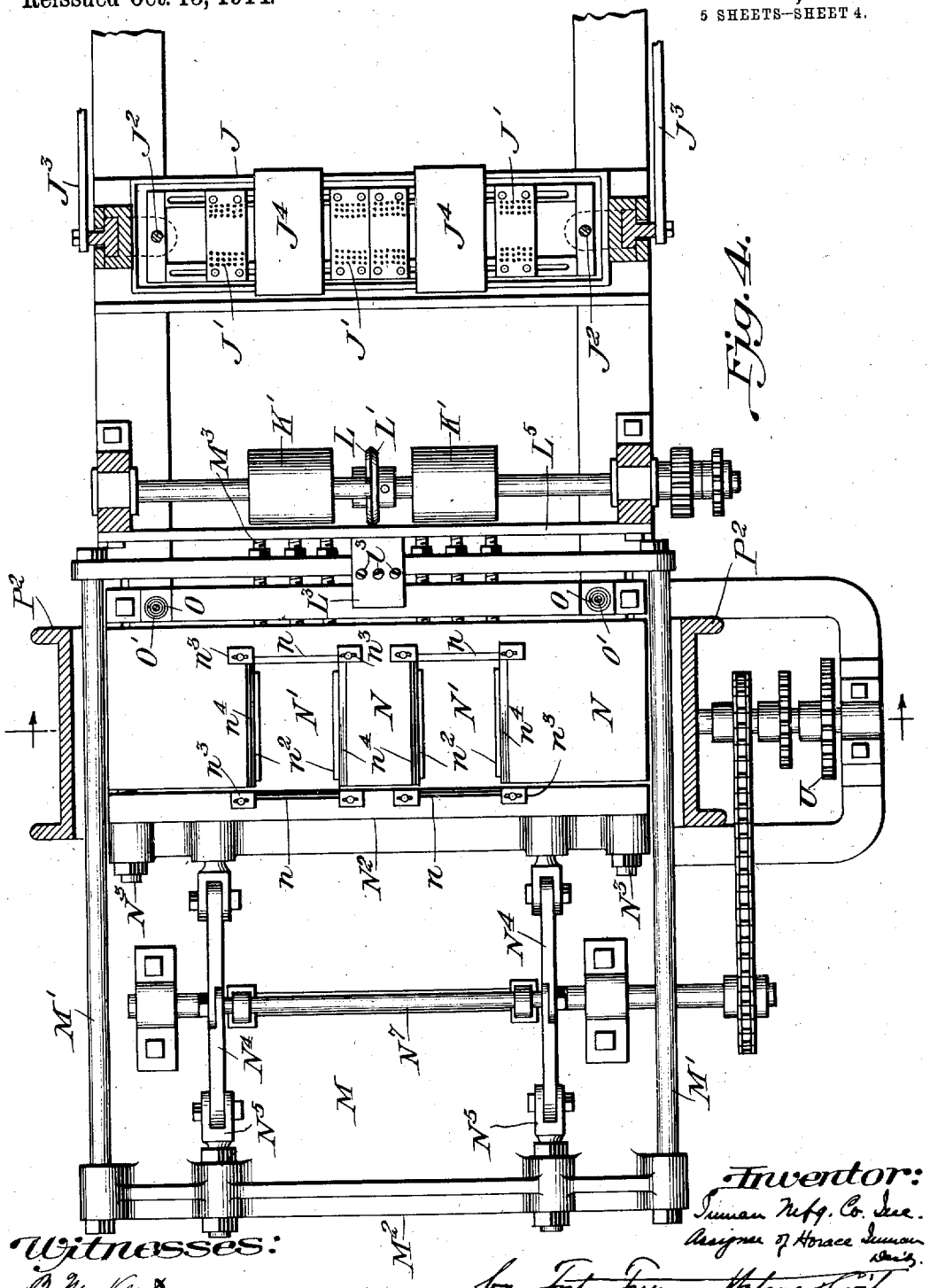
Figure 5:
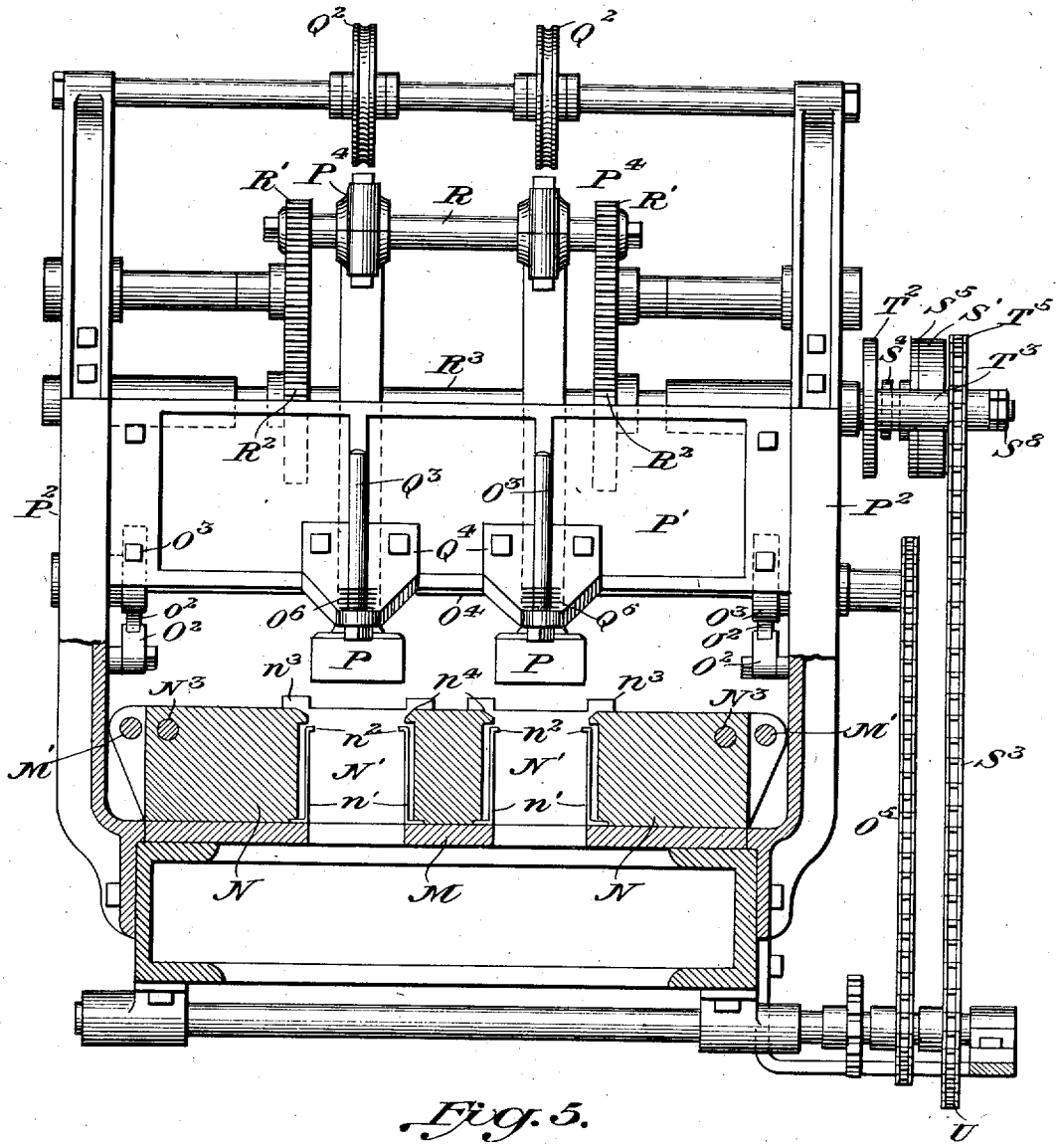

Referring to the accompanying drawings wherein there is illustrated a preferred embodiment of the invention, Figure 1 is a side view, partly in section, showing a portion of the machine embodying the invention; Fig. 2 is a side view showing a further portion of the machine; Fig. 3 is an enlarged longitudinal sectional view through the plunger and die portion of the machine; Fig. 4 is a plan view of the same; Fig. 5 is a transverse sectional elevation showing the plunger and die; Fig. 6 is a detail view of the stop motion device; Fig. 7 is a diagram showing the various operations upon the web in forming the boxes.

While the invention may be used for making many and various forms of boxes or receptacles, the parts thereof being modified or changed in construction and relative relations or adjustments to suit the requirements of any particular case, the invention is shown as embodied in a machine adapted to make trays or more particularly receptacles having a bottom and sides and ends secured together, with an open top, and these may be used separately or two of them together to make a complete telescoping box, but it is understood that other forms of trays or receptacles can be made wherein the cover is an integral part of the box body.

One of the main objects of the invention is to provide a machine which is capable of performing all the necessary operations in making the complete boxes or trays from a continuous web of paper, including the printing or ornamenting of the same, which is performed on the web in its passage through the machine, cutting and scoring the same, applying adhesive material to the proper parts, folding, pressing the folded parts together and delivering the completed box.

A further object of the invention is to provide a machine in which the flaps or folded portions of the blanks are formed at the adjacent ends of the blanks so that boxes of different lengths can be made with the same dies by changing the feed of the web between successive operations of the dies.

The various devices for performing the various functions are made adjustable with relation to each other so that boxes or receptacles of different sizes can be made by changing or substituting some parts, as for instance one set of dies for another, and adjusting the relations of the other parts.

Experience has taught that when a web of material is delivered to a machine of this character and manipulated in the manner set forth, it is exceedingly advantageous to use a rotary printing apparatus which is continuously operating, while of course many of the other operations are intermittently performed, necessitating that the web be in a state of rest during said operation. So, too, in intermittently feeding the web to submit it to different operations, it is absolutely necessary, in order to make good work and produce proper register between the various operations performed on the articles, to feed the material the exact amount necessary at each movement, for if the error in feeding is only slight it is rapidly multiplied so that the parts will not properly operate to perform their functions on the material at the proper places.

There will be first described the means whereby the machine is adapted to intermittently feed the material from a continuous web or roll. The material A is in the form of a roll A′ mounted upon a suitable support $A^2$ arranged adjacent the machine, and the shaft $A^3$ supporting the roll is under a constant friction through any suitable device, as indicated at $A^4$, which prevents the roll from overrunning to any great extent. From the roll the paper passes to a slack take-up device B which is adjustably mounted with relation to the printing apparatus, and the other operating parts of the machine, and while this slack device may be variously constructed, it is shown as comprising suitable column supports B′, each having a longitudinal bar $B^2$ on which are adjustably mounted the auxiliary frames $B^3$, $B^4$. These frames carry in suitable bearings guide rollers $b^2$, $b^3$, $b^4$, $b^5$, and preferably the outer guide rollers, as $b^2$, $b^5$, have collars, as $b^6$, at their ends to aid in guiding the web of material between them. Interposed between each pair of guide rollers, as between $b^2$, $b^3$, and $b^4$, $b^5$, are dandy rollers $b$, and $b'$, which are guided in elongated slotted bearings $b^7$, $b^8$, and are free to rise and fall in these bearings and to act as slack take-up rollers in the manner hereinafter described.

The printing devices, as above intimated, may vary in details of construction according to the requirements of any particular case, but in the form illustrated there is a printing cylinder C and an impression cylinder C′ mounted in a suitable frame $C^3$ which is adjustable with relation to the box-forming parts of the machine in any suitable way, and is shown as having arms $C^4$ adjustably secured to the main frame of the machine. Also mounted in the frame $C^3$ is a suitable inking apparatus comprising among other things an ink applying roll $C^5$ and proper ink supplying and distributing rollers, such, for instance, as are generally outlined in the drawing but need not be specifically described. Also mounted in the frame $C^3$ are the rotary feed rollers D, D′, and these feed rollers are connected to be driven in unison or harmony with the printing rollers C, C′, by any suitable means, such as indicated in the drawing, and are further to be driven in harmony with the other parts of the machine, as will appear hereafter.

As above indicated, it is desirable that the printing rollers should rotate continuously in order to get effective distribution of the ink, and consequently the feed rollers D, D′ are driven continuously, and as the material is intermittently fed through the machine to receive the subsequent operations, some means must be provided to allow this to be done. In the present instance the printing cylinder C is of less diameter than the impression cylinder C′, and mounted on the printing cylinder C is the printing form $C^6$ which extends around the surface of the printing cylinder to a greater or less extent according to the size of the articles to be produced or the extent of the printing upon said articles. Sometimes the printing is limited to the bodies of the boxes or receptacles, while again the end portions or the side portions, either or both, receive printing, and the size of the form $C^6$ varies accordingly. It is necessary, however, that the form should be less in circumference than the face of the printing cylinder so as to leave a blank space $c$ on the surface of the cylinder between the ends of the form. It is of course necessary that the paper while being printed should be fed forward at a rate of speed corresponding with the travel of the printing surface, and consequently the feed rollers D, D′, are arranged to produce this feed. It is further necessary that the printing cylinders should make a complete rotation to each complete reciprocation of the other parts of the machine hereafter to be described.

In many instances it is desirable that the printing should commence at least, if not be completed, while the main body of the web is stationary, and this tends to buckle up or gather the web between the feed rollers D, D′ and F, F′. It is then desirable to take up this slack thus formed, and to permit this to be done the feed rollers D, D′, or one of them, may be provided with cut-away portions, but preferably it is only necessary to cut away portions of the upper feed roller D′. This feed roller is preferably made up of disks set at different distances apart upon the shaft $d'$, and they are provided with cut-away portions $d$. These disks can be adjusted on the shaft so that the cut away portions will overlap each other to a greater or less amount. The advantage of using disks is apparent, as they can be adjusted at different distances apart so that in feeding the printed web they will not come in contact with the printed matter.

There will now be described briefly the operation of the parts so far described, and for this purpose will assume that the web A beyond the feeding rollers D, D′, is in a stationary condition. As the feed rollers D, D′ and printing rollers C, C′, rotate, the paper will be gripped preferably first between the feed rollers D, D′ and moved forward and receive the printing as the printing rollers C, C′ rotate, the excess of paper being buckled up or gathered behind the feed rollers D, D′. This forward movement of the web A first draws up the dandy roll $b'$ until it is at or near the top of the elongated bearings, and then, further drawing the web, raises the dandy roll $b$ and thence tends to unroll the paper from the roll A. As soon as the paper passes the printing form $C^6$ or the uncut-away portions of the feed roller D′, the dandy roll $b'$ by its weight tends to draw back the slack, and as the inertia of the roll A′ may carry it beyond the distance necessary, the dandy roll $b$ tends to take up this slack. In practice it is found that there is practically enough slack between the printing rolls and the roll of paper to supply material for two printings, although of course this may vary according to the relative tension of the parts and length used. As a matter of fact the operations of the whole machine are performed with such rapidity that the roll A′ may be said to be practically unwinding all the time, and the dandy roll *b* may be said to take up the unwound excess or slack from the roll, while the dandy roll *b′* may take up the slack drawn back through the printing and feeding rolls after the printing is done. The more nearly this ideal operation is attained, the more perfect and satisfactory it is. From this it follows that when the paper is gripped between the feeding rollers D, D′, to be fed forward and printed, there is no strain upon the paper except that due to the weight of the dandy roll *b′*, and the danger of slipping or inaccurate register is avoided. Having thus explained how the web is primarily fed and printed, there will now be explained the further manipulations of the web to make the completed article. Mounted adjacent the printing apparatus is an intermittently operated feeding device comprising the rollers F, F′, and these are arranged in bearing which also support the cutting and scoring rollers G, G′, and these rollers rotate in unison by any suitable intermittently operating means. In the present instance there is indicated a preferred operating means, such as is more fully disclosed and claimed in Patent No. 1,030,183 and so it is only necessary to describe the same, in this application, sufficiently to enable the operations to be generally understood. Connected to the main driving shaft H is a crank disk H′ to which is connected a rack-bar $H^2$ which operates in connection with a pinion $H^3$ loose on the shaft $H^4$ and having a suitable clutch device whereby as the rack-bar moves rearward the feed rollers F, F′ are operated, while when the rack-bar moves forward, the feed rollers remain stationary. The cutting and scoring devices are of a well-known type indicated in the drawings, and of course are adjustable in different relations to cut and score the blank longitudinally according to the requirements of any particular case.

In the present instance, shown in Fig. 7, the web is cut to trim the edges on the lines *g* and scored on the lines *g′*. Interposed between the feed rollers F, F′, and the feed rollers D, D′, is an adjusting device comprising the roller E mounted in slotted bearings E′ and capable of adjustment in those bearings by any suitable device, as a hand wheel $E^2$ and beveled gear connections with the bearings of the roller E. The purpose of this arrangement will be apparent to those skilled in the art as it is well known that it is difficult to feed a continuous web by two different positively operating feed devices, intermittently operating on the web, and get perfect register unless means are provided so that each feed can practically act independently of the other. Moreover, in order that the parts shall properly register, the distance between the feeding devices has to be accurately adjusted under different circumstances, and the purpose of the roller E, which is out of the line or path of the web, is to lengthen or shorten the path of the web so that the proper part of said web will be presented to the intermittently operating feed rollers F, F′, and register be maintained. Again, as before seen, in operating the feed rollers D, D′, a certain amount of slack is produced in the web behind the rollers, and in actual operation it is preferable to adjust the relations of the two sets of feed rollers D, D′ and F, F′ so that the latter shall commence to feed the material slightly after the feed rollers D, D′ have commenced to feed the same, so that when the feed rollers F, F′ start to feed the web there will be no slip and it will have to move bodily but a small section or portion of the web in front of the feed rollers. In practice, after the feed rollers have started in this way both sets of rollers D, D′ and F, F′ operate concurrently for a portion of their feed, and when the web is released from the feed rollers D, D′ by coming opposite the cut-away portion *d*, the feed rollers F, F′ still continue to move a certain extent and act in opposition to the dandy roll *b′* which tends to take up this slack, and by properly adjusting the roller E, when the web stops moving it will be in proper registry both for the next printing operation and the next intermittent feeding operation.

The next operation upon the blank in the machine illustrated consists in cutting or punching out pieces at the adjacent ends of the blanks to form the parts which are folded over or interlocked and fastened together in making the box, an operation which is ordinarily termed dieing. There is shown at I a platen moving on posts I′ and reciprocated by the connection $I^2$ operated from suitable connections on the main shaft H. This platen is arranged to operate suitable supplementary dies which are inserted between the platen and the bed $I^3$, and for the sake of clearness in this particular instance the dies are not shown, they being of any usual construction and varying in their contour according to the particular parts to be cut or formed in making any particular box. It will be understood that these dies are operated while the blank is intermittently resting in its motion through the machine, and the dies in this particular instance are arranged to form the flaps *i*, *i*, on the adjacent ends of the box blanks, as shown in Fig. 7. Each blank is thus formed by two successive operations of the dies and therefore it will be evident that any given arrangement of the dies is adapted to make boxes of different lengths by merely changing the feed of the web between successive operations of the dies. While this operation is being performed by the dies the preceding blanks are receiving the adhesive material. While various forms of devices may be used for applying the adhesive material, there is shown a vat J containing the material, in which are arranged pins J′, and these are arranged to be lifted by a rod $J^2$ operated in the present instance by a lever $J^3$ connected with the platen I and moving concurrently therewith. In this way the adhesive material is lifted up on the ends of the pins J′ and impressed upon the under side of the blanks, the parts being adjustable to so locate the pins J′ that the adhesive material will be placed on the proper portions of the different sized blanks. Over the vat is an arm $J^4$ beneath which the blank passes and which serves as an abutment in applying the adhesive.

Arranged beyond the vat are the feed rollers K, K′ in suitable bearings on the frame of the machine, and these feed rollers are preferably driven by positive gearing connected to the feed rollers F, F′, and there is shown a sprocket chain $K^2$ for this purpose, there being an adjustable idler roller $K^3$ for taking up the slack of the chain. Also mounted on the shafts carrying the feed rollers K, K′ are the cutters L, L′ which operate to make the longitudinal cut *l* between the two series of blanks. As these cutters are apt to depress one of the cut edges and raise the other out of the longitudinal plane through which the material passes, guides $L^2$, $L^3$, are provided, the former consisting of a series of arms secured in the present instance to the bar $L^4$, and the latter, $L^3$, being shown in the form of a plate secured to the bar $L^5$, forming a passage through which the web moves. Mounted in the plate $L^3$ is a series of pins or screws $l^3$ which can be adjusted so as to cause the adjacent cut edges of the web to again lie in the longitudinal plane through which it passes, so that the material will be practically flat as it passes to the cutters hereafter to be described. The slitted web is fed along for the next series of operations, which consist in forming the box or tray and severing the blanks therefor from the longitudinal web. In the present instance there is shown an improved mechanism for accomplishing these results which will now be described. Mounted on the main frame of the machine is an auxiliary frame M shown in the form of a cast iron bed, the upwardly projecting end portions being further secured by the stay bars or connecting rods M′. Adjustably mounted in the auxiliary bed M is a die piece N having openings N′ to receive the plungers and boxes hereafter described. These openings N′, two being shown in the present instance, have three sides formed in the die piece N, the other side being movable and shown as a transverse bar or plate $N^2$, and this bar $N^2$ is mounted on pins $N^3$ secured to the body N. The movable side $N^2$ can be operated by any suitable means, and as shown there are provided toggle levers $N^4$ connected to the side $N^2$ and to adjustable bearings $N^5$ in the rear end $M^2$ of the auxiliary bed. These toggles are operated by a cam $N^6$ on a shaft $N^7$ driven in a manner hereafter described to move the side $N^2$ to and from the die piece N for the purpose hereinafter stated. Thus the die piece N and movable piece or bar $N^2$ constitute the female dies in which the boxes are formed, and it is preferable to bevel or chamfer the top edges of the dies adjacent the openings, as at *n*, and mount in recesses in these dies spring arms *n*′ having projecting flanges $n^2$ on the two opposite sides of the die, the purpose of which will appear later.

The die piece N is adjustably mounted in the auxiliary frame M and, (for the purpose of making boxes of different sizes), may be adjusted therein in any suitable way, as by means of the screws $M^3$. Coöperating with these dies N are the plungers P which are mounted in a cross piece P′ supported by the uprights $P^2$ secured to the main frame. These plungers are adapted to be adjusted in any suitable way, for example, as shown in Patent No. 539,480, to coöperate with the die piece N, in the various positions of the latter, to make boxes of different sizes and are reciprocated to perform their function in a peculiar way and by the mechanism which will now be described. The unserved blanks to form the trays are fed over the openings in the die piece N in proper relations thereto, and when the plunger operates it is first moved downward sufficiently to engage the blanks and lightly hold them in their proper places while the blanks are severed from the web by the cutters O, O′. The next operation of the plungers forces the blanks into the dies N and forms the trays, and in order to facilitate this operation and cause the parts to fold in properly, there are provided blocks $n^3$ at each of the corners and these are preferably adjustably mounted on the die piece N and the bar $N^2$ as shown. The function of these blocks is to insure the inward folding of the ends of the lap portions of the sides of the box against which the end portions of the box are folded, and the beveled edges $n^4$ on the sides of the openings are preferably slightly less in extent than the beveled portions *n* on the ends, so that the side portions of the box blank will first be turned up before the end portions of the box are turned up as the blank is forced into the die. This is of particular advantage to prevent any wearing or rubbing of the adhesive material, it being desirable to have the sides and the lap portions thereof folded into their normal positions slightly before the end portions of the box are brought into their normal positions, and then they are pressed directly against the adhesive material without previously rubbing or disturbing it. When the plunger reaches its lowest position and the box has been folded in the manner just described, the plunger rests or dwells in this position in order to give an opportunity to press the parts of the box together. While the plunger is in this position the bar $N^2$ is operated by means of the toggles to exert a heavy pressure on the ends of the box while held by the plunger in the die N, and in this way it is possible to give a very heavy pressure to those portions of the box to which the adhesive is applied and insure the parts adhering. As but one side of the die moves, that is, the bar $N^2$, in order to get an even pressure upon both ends of the box the plunger is arranged so that it can move longitudinally in the die, and to permit this movement there is provided a spring bearing $P^3$ in connection with the support P′, which allows the plunger to move forward slightly while in the die. When this is accomplished the toggles are loosened and the bar $N^2$ moves backward; the plungers rise to the full extent of their upward movement and are held in this position, and the springs $n'$ grasp the box and strip it from the plunger as it moves upward. While this operation of folding and securing the parts of the box has been taking place, the blanks are severed by the cutters O, O′, and, as before intimated, these operate after the first downward movement of the plungers while the material is grasped between the plungers and dies.

While different forms of cutters may be used, there is shown a well known form of shear cutters which are normally held open by a spring $o$ on a guide pin $o'$ at each end, and the upper cutter is moved downward at the proper time to sever the blanks. In this instance there are shown pivotally mounted on the uprights $P^2$, levers $O^2$ which rest upon the upper cutter bar O′, and these levers $O^2$ preferably have friction wheels $o^2$ against which the cams $O^3$ impinge, they being mounted on a shaft $O^4$ operated by a sprocket chain $O^5$ so as to depress the cutters quickly and sever the blanks at the proper time. This arrangement of the cutter actuating mechanism permits the necessary adjustment of the cutters on the auxiliary frame M, to suit the different sizes of blanks.

While different means may be used to operate the plungers, there is shown a preferred construction which accomplishes the results satisfactorily. In order to facilitate the operation of the plungers they are counterbalanced by means of weights Q connected by suitable connections, as a chain Q′ passing over the sheave $Q^2$, and these counterweights are guided by the pins or rods $Q^3$ in brackets $Q^4$ and are preferably provided with take-up springs $Q^6$.

The plungers P are provided at their upper ends with a cross-slotted bearing $P^4$ in which operates a crank pin R on the crank wheel R′ suitably supported in the uprights $P^2$. These crank wheels are driven by gears $R^2$ on a shaft $R^3$, on which shaft is mounted the variable stop motion for producing the different movements of the plungers, as heretofore described.

The variable stop motion consists of a disk S fast on the shaft $R^3$, and this is provided with a dog $s$ projecting beyond its periphery and normally forced outward by a spring $s'$. Loosely mounted on the shaft is the cap-piece S′, the inner periphery of which is provided with a series of notches $s^2$ adapted to be engaged by the dog $s$. Mounted on the hub of this cap-piece and secured thereto is a sprocket wheel $S^2$ which is driven by a suitable sprocket chain $S^3$ so that it rotates continuously and carries with it the cap S′. Slidably mounted upon the shaft $R^3$ is a clutch portion $S^4$ having a disk $S^5$ provided with a series of pins or projections $s^5$ according to the number of stops desired in connection with the plungers. These pins $s^5$ can be variably spaced on the disk $S^5$. This clutch portion $S^4$ is moved longitudinally on the shaft $R^3$ under the stress of a spring $S^7$ and is moved in the opposite direction by the lever T connected to a rod T′ on the uprights $P^2$, the other end extending into position to be operated by lugs $t$ on a disk $T^2$ mounted on a sleeve $T^3$ rotating upon a stud $T^4$ and carrying a sprocket wheel $T^5$ connected to be driven by the sprocket chain $S^3$ so as to move in unison with the other portions of the stop motion. The lugs $t$ are adjustably mounted in the disk $T^2$ and there may be any desired number of them corresponding to the number of stops desired. The cap-piece S′, while loosely mounted on the shaft $R^3$, is under the stress of a friction device shown as the lock nuts $S^8$ with a suitable washer or friction gasket between them and the cap-piece, so that there is more or less friction between the parts and sufficient to tend to rotate the shaft to carry the dog beyond the stop pin $s^5$ after it has been knocked out of engagement by said pin.

It will now be seen that when the parts are in their normal position the dog engages the notches $s^2$ and the shaft $S^3$ is rotating, but when the dog reaches one of the pins $s^5$ it is knocked out of engagement with the tooth $s^2$ and the shaft $R^3$ immediately stops in this condition until, through the medium of a lug $t$, the lever T moves the clutch portion $S^4$ longitudinally on the shaft $R^3$, so as to withdraw the pin $s^5$ out of the path of the dog $s$, when it immediately again engages the tooth $s^2$ and the shaft is rotated until the dog reaches another pin $s^5$, when the operations are repeated. It will thus be seen that by properly positioning the pins $s^5$ and the lugs $t$, any desired number of stops or spaces of time between the stops can be obtained. In order to drive these various parts of the die and plunger, there is provided a cut sprocket chain connected to the main shaft and sprocket wheel on the shaft U, and from this shaft are driven the cam operating toggle, the cutter and the stop mechanism, so that the parts coöperate together in proper times and relations.

Such being the general construction and arrangement of the mechanism, it will be seen that it provides a complete apparatus whereby boxes or receptacles may be made from a continuous web, which web may be printed, cut, scored, adhesive material applied, folded and the adhesive parts attached under heavy pressure in one continuous operation, and the various devices can be adjusted with relation to each other to make boxes or receptacles of different sizes and characteristics and so as to produce practically perfect registry throughout all the operations.

What I claim is:—

1. In a machine of the character described, the combination of printing devices including a rotary printing cylinder having a form extending but partially over its surface, a rotary impression cylinder coöperating with said printing cylinder, means for scoring, folding and pasting a blank, and feeding devices including a rotating cylinder, and a rotary disk coöperating with said cylinder and having a portion of its periphery cut away, substantially as described.

2. In a machine of the character described, the combination of printing devices including a rotary printing cylinder having a form extending but partially over its surface, a rotary impression cylinder coöperating with said printing cylinder, means for scoring, folding and pasting a blank, and feeding devices including a rotating cylinder, and a plurality of feed disks each having a portion of its periphery cut away, whereby the extent of each feed movement imparted to a blank may be adjusted, substantially as described.

3. A machine of the character described including continuously rotating printing rolls, intermittently operating devices for feeding, scoring, folding and pasting a blank, and means for operating said devices, said feeding and printing devices being so constructed that the feed devices are caused to operate slightly before the printing devices, so that the feeding of a blank commences before the printing thereof begins.

4. A machine of the character described including continuously rotating printing rolls, intermittently operating devices for feeding, scoring, folding and pasting a blank, and means for operating said devices, said feeding and printing devices being so adjusted that the feed devices are caused to operate slightly before the printing devices, so that the feeding of a blank commences before the printing thereof begins, and slack take-up devices.

5. In a machine of the character described, the combination with means for longitudinally scoring, folding, and pasting a blank, and intermittently operating printing devices adapted to operate upon the blank prior to said means, of intermittently operating feed devices, for feeding to the printing devices, cutting devices and a second set of independently operating feed devices, for feeding to the cutting devices, and a blank adjusting device arranged between the two sets of feed devices, substantially as described.

6. In a machine of the character described, the combination with means for longitudinally scoring, folding, and pasting a blank, and intermittently operating printing devices adapted to operate upon the blank prior to said means, of intermittently operating feed devices for feeding to the printing devices, cutting devices and a second set of independently operating feed devices adapted to feed the blank to the cutting devices, and blank adjusting devices arranged intermediate of said sets of feed devices.

7. In a machine of the character described, the combination with means for longitudinally scoring, folding, and pasting a blank, and intermittently operating printing devices adapted to operate upon the blank prior to said means, of intermittently operating feed devices, for feeding to the printing devices, cutting devices and a second set of independently operating feed devices adapted to feed the blank to the cutting devices, and an adjustable roller arranged between the two sets of feed devices.

8. In a machine of the character described, the combination with rotary printing devices arranged to operate intermittently, of rotary feed devices having cut-away portions, cutting and supplemental feeding devices, and scoring devices, means for operating said devices, the rotary printing and feed devices being connected to operate in unison and the supplemental feeding devices and cutting and scoring devices being connected to operate in unison, substantially as described.

9. In a machine of the character described, the combination with rotary printing devices arranged to operate intermittently, of rotary feed devices having cut-away portions and adapted to be intermittently operated, a second set of supplemental feeding devices, and scoring devices, the rotary printing and feed devices being connected to operate in unison and the second set of feeding devices and scoring devices being connected to operate in unison, and an adjustable take-up roller arranged between the two sets of devices, substantially as described.

10. In a machine of the character described, the combination with means for longitudinally scoring a blank, and rotary printing devices arranged to operate intermittently, of rotating feed devices having cut away portions and arranged to operate intermittently on a blank, means to operate said feeding devices slightly before the printing devices, cutting devices, and supplemental feeding devices arranged to feed to the cutting devices and means to operate said second feeding devices intermittently and slightly after the first feed devices.

11. In a machine of the character described, the combination with means for supporting a roll of material, of means for cutting and cross scoring blanks from the roll of material, means for longitudinally scoring said blanks, printing devices arranged to operate intermittently, feeding devices arranged to rotate and operate intermittently on the material, slack take-up devices between said means for supporting the roll of material and the printing devices, supplemental feed devices arranged to operate intermittently, and an adjustable roller between the two sets of feed devices.

12. In a machine of the character described, the combination with the rotary printing devices arranged to rotate continuously and operate intermittently, rotary feeding devices arranged to operate in unison with the printing devices, a second set of feeding devices arranged to operate intermittently, scoring devices arranged to operate in unison with said second set of feeding devices, a dieing device, a pasting device, cutting and scoring devices and a third set of feeding devices arranged to operate intermittently to feed from the cutting and scoring devices.

13. In a machine of the character described, the combination with feeding devices arranged to operate intermittently, of a longitudinal cutting device operating in unison therewith, a transverse cutter arranged to operate intermittently, and guides between the two cutters, comprising arms and a plate above the arms, the latter having adjusting pins, substantially as described.

14. In a machine of the character described, the combination with the main frame of the machine, of an ordinary frame, a stationary die-piece mounted therein, and having a plunger passage formed therefrom and opening laterally through one face of the die piece, a plunger coöperating with said die piece and yieldable laterally thereof, a movable side piece adapted to close said lateral opening in the plunger passage, and means for moving the same in said auxiliary frame, substantially as described.

15. In a machine of the character described, the combination with the die-piece having formed therein a plurality of openings, each surrounded on three sides by the body of the die piece, of a movable side piece, adapted to close the fourth side of all of said openings, and toggles for operating the side piece, substantially as described.

16. In a machine of the character described, the combination with the auxiliary frame, of a die-piece adjustably mounted in said frame and having a plurality of openings therein, a movable side piece for closing one side of each of the openings in the die piece, means for moving the side piece, and adjusting devices for said means, substantially as described.

17. In a machine of the character described, the combination with a die-piece having an opening, of an intermittently-operating plunger, and means for stopping the plunger in three relatively variable positions relative to the die-piece, substantially as described.

18. In a machine of the character described, the combination with a die-piece having an opening, of a reciprocating plunger, and a variable stop motion device controlling the motions of the plunger, whereby the plunger may be stopped at three relatively variable positions with relation to the die-piece, substantially as described.

19. In a machine of the character described, the combination with the die-piece having an opening, of a reciprocating plunger, a transverse cutter, and means for intermittently operating the plunger and the cutter on the stroke toward the die-piece, the cutter being arranged to operate during an intermission of the movement of the plunger, and while the blank to be severed is engaged by the plunger, substantially as described.

20. In a machine of the character described, the combination with a die-piece and transverse cutter, of an intermittently-operating plunger, means for operating the plunger to grasp the material between the die-piece and plunger and holding the plunger stationary for an interval, means for operating the cutter while the plunger is thus held stationary, means for thereafter forcing the plunger into the die and allowing it to rest therein, and means for elevating the plunger, substantially as described.

21. In a machine of the character described, the combination with a die-piece having a movable side piece, of an intermittently-operating plunger adapted to move laterally of the die piece and in the direction of the path of movement of the movable side piece, means for moving the plunger to grasp the material between the die and plunger, means for moving the plunger into the die and then for moving the side piece to press the material between the plunger and sides of the die, and means for elevating the plunger, substantially as described.

22. In a machine of the character described, the combination with a die-piece having a movable side, of a counterbalanced laterally yieldable plunger, and means for moving the plunger and stopping the same at three points with relation to the die, substantially as described.

23. In a machine of the class described, the combination of a die having a plunger passage therein, a movable member forming one side of the die, and a reciprocating laterally yieldable plunger coöperating with said die.

24. In a machine of the class described, the combination of a die having a plunger passage therein, a movable member forming one side of the die, and a reciprocating plunger coöperating with said die and adapted to yield in the direction of movement of said member.

25. In a machine of the class described, the combination of a die having a plunger passage therein, a movable member forming one side of the die, a reciprocating plunger coöperating with the die, and guiding means for the plunger adapted to permit the latter to yield in the direction of movement of said member.

26. In a machine of the class described, the combination of means for feeding a strip of material through the machine, intermittently operating scoring and dieing means adapted to form blanks with the securing flaps on the adjacent ends of the blanks, adjustable pasting mechanism, adjustable blank severing means, adjustable forming mechanism, and means whereby the length of feed between successive operations of the scoring and dieing means may be varied.

27. In a machine of the class described, the combination of means for feeding a strip of material through the machine, intermittently operating scoring and dieing means adapted to punch out portions of the material at the adjacent ends of the blanks to form the securing flaps, adjustable pasting mechanism, adjustable blank severing means beyond said pasting mechanism, adjustable forming mechanism comprising a member movable longitudinally of the machine to secure the sides of the box together, and means whereby the length of the feed between successive operations of the scoring and dieing means may be varied.

28. In a machine of the class described, the combination of means for feeding a strip of material through the machine, intermittently operating scoring and dieing means adapted to punch out portions of the material at the adjacent ends of the blanks to form the securing flaps, adjustable pasting mechanism, forming mechanism adjustable to make boxes of different sizes and comprising a reciprocating plunger and a member movable longitudinally of the machine to secure the sides of the box together, blank severing means, and means for varying the length of the feed between successive operations of the scoring and dieing means.

29. In a machine of the class described, the combination of means for feeding a strip of material through the machine, intermittently operating scoring and dieing means adapted to punch out portions of the material to form the securing flaps on the adjacent ends of the blank whereby one arrangement of dies is adapted to make blanks for boxes of different length, adjustable pasting mechanism, forming mechanism comprising a reciprocating plunger, a die having a side movable longitudinally of the machine to secure the sides of the box together, blank severing mechanism adjustable to suit blanks of different lengths, and means for varying the length of feed between successive strokes of the scoring and dieing mechanism.

30. In a machine of the class described, the combination of scoring and dieing mechanism arranged to operate on a web of material while the same is stationary, printing mechanism, two independently operating web feeding devices, means whereby the feed of said devices may be relatively adjusted and adjustable means for determining the minimum length of web between said devices.

31. In a machine of the class described, the combination of scoring and dieing mechanism arranged to operate on a web of material while the same is stationary, printing mechanism, two independently operating web feeding devices, means whereby the feed of said devices may be relatively adjusted and means adjustable transversely of the web for determining the minimum length of web between said devices.

32. In a machine of the class described, the combination of scoring and dieing mechanism arranged to operate on a web of material while the same is stationary, printing mechanism, two independently and intermittently operating web-feeding devices, the first of which to receive the web feeds the web a greater distance than the second, and means for drawing the web back through said first feeding device between successive forward feeding operations thereof.

33. In a machine of the class described, the combination of scoring and dieing mechanism arranged to operate on a web of material while the same is stationary, printing mechanism, two independently and intermittently operating web feeding devices, the first of which to receive the web feeds the web a greater distance than the second, means for drawing the web back through said first feeding device between successive forward feeding operations thereof, and means for determining the minimum length of web between said devices.

34. In a machine of the class described, the combination of scoring and dieing mechanism arranged to operate on a web of material while the same is stationary, printing mechanism, two independently and intermittently operating web-feeding devices, the first of which to receive the web feeds the web the same distance for different lengths of blanks and the other of which feeds the web a distance dependent upon the length of the blank, and means for drawing the surplus of web, fed by said first device, over that fed by said other device, back through said first device between successive forward feeding operations of the latter.

35. In a machine of the class described, the combination of scoring and dieing mechanism arranged to operate on a web of material while the same is stationary, printing mechanism, two independently and intermittently operating web feeding devices, the first of which to receive the web feeds the web the same distance for different lengths of blanks and the second of which feeds the web a distance dependent upon the length of the blank, means for drawing the surplus of web, fed by said first device, over that fed by said other device, back through said first device between successive forward feeding operations of the latter, and adjustable means for determining the minimum length of web between said devices.

INMAN MANUFACTURING CO. INC.,
*Assignee of Horace Inman,*
By R. A. WOOD,
*Vice-President.*

Witnesses:
CHAS. H. INMAN,
THOMAS A. HENNESSEY.